United States Patent [19]

Hanneman et al.

[11] 4,049,186

[45] Sept. 20, 1977

[54] PROCESS FOR REDUCING STRESS CORROSION IN A WELD BY APPLYING AN OVERLAY WELD

[75] Inventors: Rodney E. Hanneman, Burnt Hills; Richard M. Chrenko; Donald B. Kittle, both of Scotia, all of N.Y.

[73] Assignee: General Electric Company, Schenectady, N.Y.

[21] Appl. No.: 734,323

[22] Filed: Oct. 20, 1976

[51] Int. Cl.² .............................................. B23K 9/04
[52] U.S. Cl. .................................... 228/225; 219/61; 219/137 WM; 228/119
[58] Field of Search ............... 228/226, 119, 225, 222; 219/76, 61, 137

[56] References Cited

U.S. PATENT DOCUMENTS

| | | | |
|---|---|---|---|
| 2,249,723 | 7/1941 | Orr | 219/76 X |
| 2,280,150 | 4/1942 | Hasse | 228/222 |
| 2,963,129 | 12/1960 | Eberle | 228/226 X |
| 3,139,511 | 6/1964 | Kudelko | 219/76 |
| 3,555,236 | 1/1971 | Hayashi | 219/76 |

*Primary Examiner*—Al Lawrence Smith
*Assistant Examiner*—Nicholas P. Godici
*Attorney, Agent, or Firm*—Charles T. Watts; Joseph T. Cohen; Jerome C. Squillaro

[57] ABSTRACT

The stress corrosion tendency of a welded pipe in service in a nuclear reactor water line is reduced by applying to the outside of the pipe a secondary weld bridging the primary weld of the joint beyond the axial extremities of the primary weld heat affected zone and particularly that part of the zone at the inner surface of the pipe.

5 Claims, 7 Drawing Figures

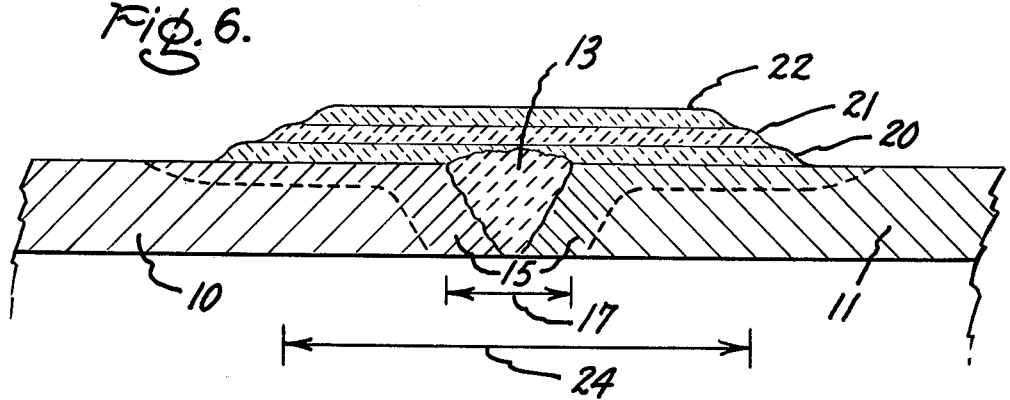
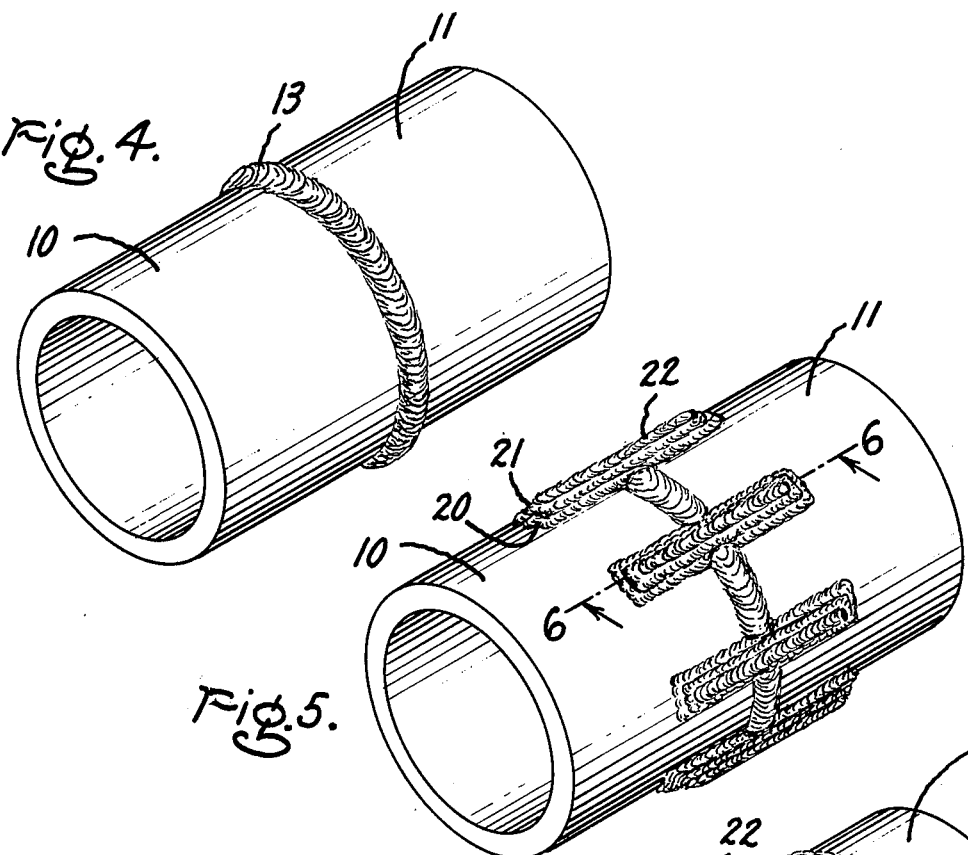
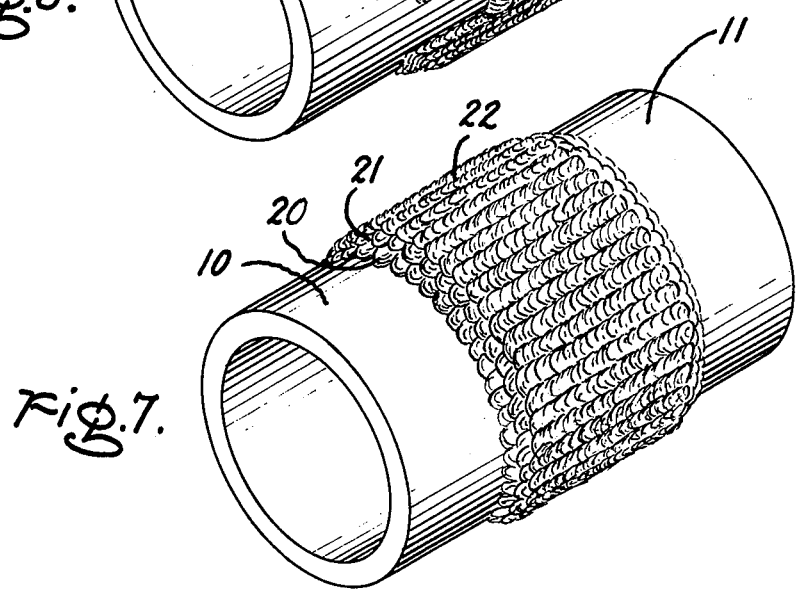

PROCESS FOR REDUCING STRESS CORROSION IN A WELD BY APPLYING AN OVERLAY WELD

The present invention relates generally to corrosion prevention and is more particularly concerned with a novel method of eliminating or substantially reducing the stress corrosion tendency in welded water pipes in service in a nuclear reactor.

BACKGROUND OF THE INVENTION

Stress corrosion cracking in weld heat affected zones of stainless steel piping in nuclear reactors has long been generally recognized as being a significant problem. Among the measures or "fixes" proposed to meet this problem are solution anneals (to desensitize the heat affected zones) after welding, controlling the temperature of the inside surface of the piping during welding, using duplex cast steel spool pieces and applying inlays of weld material over the weld heat affected zone after welding. In each instance, however, the measure cannot be applied to piping in existing plants without opening or cutting out the piping with attendant costs of risks and delays or interruptions in plant operation.

SUMMARY OF THE INVENTION

On the basis of our present inventions and discoveries to be described, welded stainless steel piping can be treated in place and even in plants having seen service to obtain the foregoing stress corrosion cracking limitation or elimination objective. Moreover, this new result is comparatively easily and economically obtained or produced, requiring no real plumbing or reconstruction but rather entailing only an overlay welding operation.

Our novel concept enabling this new result is in essence to extend the weld constraint zone (i.e., that zone of greater strength due either to greater thickness of the weld than the pipe or greater strength of weld metal than that of the pipe) of a butt welded pipe joint sufficiently that it terminates beyond or outside the existing heat affected zone of the weld at the inside pipe surface. This concept, in turn, is predicated on our discovery that under certain conditions weld metal can be applied to the outside of an existing nuclear reactor water pipe without significantly extending the as-welded heat affected zone through the pipe wall to the interior surface region. It is further based upon our discovery that the tendency toward stress corrosion cracking of welded piping can be substantially reduced by increasing the longitudinal or axial length of the weld strengthened region in such a manner that no appreciable plastic flow of metal occurs coincident with the sensitized portion of the pipe at the interior surface during nuclear reactor service.

Still further, we have found that the above desired result can be obtained as well by applying a plurality of separate radially spaced overlay or backlay welds over a butt weld joint as well as by means of one continuous overlay or backlay weld ring. Thus, the spacing can be such that the effective constraint zone of the butt weld can be extended around the circumference of the pipe and the weld as necessary to meet the objectives stated above. Saving in weld metal and in labor costs and easier access for inspection purposes are factors in favor of this discontinuous structure over the annular ring alternative of this invention. On the other hand, automatic pipe weld equipment would favor the use of the continuous backlay procedure.

We have further found not only that it is possible to provide the overlay weld without major interruption in the use of the piping or of the reactor, but also that it is generally easier to obtain the desired extension of the weld constraint zone without enlarging the sensitized heat affected zone at the inside surface region of the pipe while water remains in the pipe. Water flowing through the pipes serves to best maintain the temperature of the pipe metal through the medial portion of the pipe below the sensitizing temperature threshold throughout the period that the overlay weld is being applied to the pipe. This is particularly important where relatively susceptible heats of stainless steel pipe material are being overlayed.

External machining or grinding of the overlayed weld metal can be performed to improve ultrasonic test capabilities underneath the overlay, if needed.

In general, then, the progress of the present invention comprises the step of applying to the outside of a pipe in place or in service in a nuclear reactor a secondary or overlay weld which extends across the pipe joint and bridges on each side of the pipe joint beyond the axial extremities of the primary heat affected zone in the inner surface region of the pipe. As indicated above, this method may involve the formation of a continuous ring of weld metal extending around the circumference of the pipe entirely covering the primary weld and adjacent annular surface portions of the pipe. Alternatively, this method may involve the formation of ribs of weld metal extending axially of the pipe and spaced apart radially around the circumference of the pipe, i.e., the full length of the primary weld. Also preferably, the method will include the application of such overlay weld during the period when water is in the pipe and particularly when it is flowing through the pipe to achieve an effective heat sink condition.

THE DRAWINGS

The principal novel features and advantages of this invention are illustrated in the drawings accompanying and forming a part of this specification, in which:

FIG. 4 is a view in perspective of a butt welded stainless steel pipe joint of a typical nuclear reactor water line;

FIG. 5 is a view similar to FIG. 4 showing the pipe joint following the application of the process of this invention to provide spaced overlay welds;

FIG. 6 is a longitudinal, sectional view taken on line 6—6 of FIG. 5; and

FIG. 7 is another view like that of FIG. 5 showing the pipe joint after the application of a continuous ring overlay weld to the weld joint in accordance with the process of this invention.

DETAILED DESCRIPTION OF THE INVENTION

Figure 1:
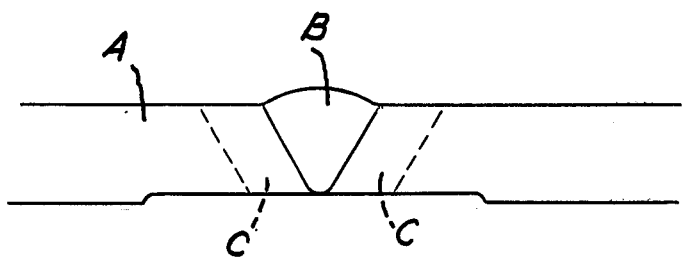
FIG. 1 is a diagrammatic cross-sectional view of an as-welded stainless steel pipe joint showing the relationship of the weld to its heat affected zone and the inner and outer surfaces of the pipe.

Weld shadow (i.e., weld geometry) effects appear to be operative in effecting the inside diameter (i.d.) strain profiles through the weld region of a pipe joint. This effect is shown in simplified form in FIGS. 1-3. Thus, profile D in FIG. 3 illustrates the gross, overall geometry effect on the i.d. surface plastic flow of the welded pipe loaded axially above its nominal "normal 304 stainless steel wall" yield point for as-welded typical four-inch pipe. The material of weld B (308 stainless steel) is much stronger at the weld service temperature than the 304 stainless steel pipe material. As shown, the sensitized band C of the heat affected zone of weld B on the pipe i.d. surface extends somewhat beyond the mechanical shadow or constraint zone of the bead of the weld. The general resultant axial strain profile on the i.d. of pipe A resulting from a typical high applied axial stress plotted as a function of distance from the center line of weld B is described by Curve D of FIG. 3. As indicated by Curve D, the normal pipe weld has a region of high strain coincident with the exposed surface of relatively highly sensitized material. When exposed to a high enough stress duty cycle and sufficiently aggressive boiling water reactor conditions, stress corrosion cracking of pipe A will occur.

Figure 2:
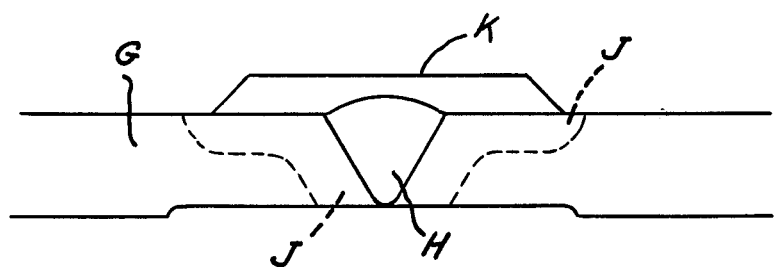
FIG. 2 is a view like that of FIG. 1 showing the backlay weld and the extension of the heat affected zone from the backlay welding operation.
Figure 3:
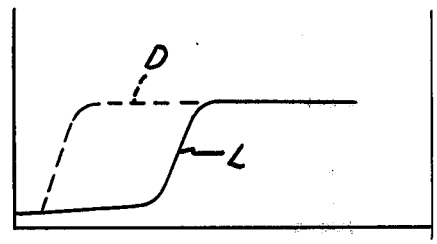
FIG. 3 is an axial strain profile chart on which strain on the inside diameter pipe surface under typical high applied axial stress is plotted against distance from the weld center line for the as-welded and the backlayed pipe joints of FIGS. 1 and 2.

In the case of FIG. 2, pipe G of the same dimensions and alloy as pipe A has a corresponding weld H and a heat affected zone or sensitized zone J which differs from zone C of pipe A because of the application of backlay weld K over weld H. Since sensitization was controlled by the presence of cooling liquid in the pipe while weld K was being applied, zone J is approximately the same size at the pipe i.d. surface as zone C. However, the pipe wall has been thickened by the backlay and the backlay extends well beyond the crown of weld H so that the low strain region extends considerably beyond the extremities of zone J at the i.d. pipe surface. Consequently, although the nominal applied pipe loadings are comparable in the two cases, the axial strain profile described by Curve L for pipe G is quite different from that of Curve D and indicates the lack of geometric coincidence of high strain and sensitization and thereby alleviates the conditions contributing to stress corrosion cracking in-service.

In the perspective view of FIG. 4, a short segment of a typical stainless steel water line of a boiling water reactor is shown to illustrate that the line is fabricated of a number of pipe lengths butt welded together in such manner that weld heat affected zones are exposed to water flowing through the pipes. Thus, four-inch pipe sections 10 and 11 are joined together rigidly and fluid tightly by weld 13 applied in the usual way with the result that stainless steel in the opposed end portions of the two pipe sections is sensitized, as described above in reference to FIG. 1.

In accordance with this invention as illustrated in FIGS. 5 and 6, a series of overlay or backlay welds 20, 21 and 22 are applied to the outside of pipes 10 and 11 over weld 13. These overlay welds are about two inches long, and are spaced radially around the circumference of the pipes and typically one inch apart to effectively extend the constraint zone of the pipe joint axially of the pipe from that indicated at 17 to that indicated at 24. These overlay welds are applied to the pipe while there is water in contact with the inside surface of the pipe so that only the outer portion of the pipe is sensitized, as indicated in FIG. 6. The water may be flowing through the pipe as in normal operation of the reactor line, or it may be delivered as a spray against the pipe inner surface of the pipe segment to which the weld overlay is being applied, but preferably to avoid steam pocket formation and to produce better heat transfer, overlay welding is not done when the water in the weld segment is not flowing. In special cases other non-aggressive fluid coolants could be used on the pipe i.d. during the backlay process. As a consequence of this operation, the stress corrosion tendency initially present in the butt welded joint of FIG. 4 is eliminated or substantially reduced by virtue of the elimination of the constraint zone termination within the heat affected zone in the region of the interior surface of the pipe.

The alternative procedure of this invention resulting in the structure illustrated in FIG. 7 involves the application of overlay or backlay weld material in a continuous ring around the pipe and throughout the length of weld 13. The overlay weld metal is typically applied in three layers, 20, 21 and 22, to insure axial extension of the constraint zone beyond the outer limits of the sensitized or heat affected zone of weld 13. In the resulting structure, therefore, the relationship illustrated in FIG. 6 is established, as those skilled in the art will understand.

To illustrate further the special features and advantages of this invention and not for purposes of limitation of the appended claims, the following detailed examples of the practice of this invention are provided for the benefit of those skilled in the art:

EXAMPLE I

For purposes of testing the concept of this invention, a welded pipe was fabricated from two segments of 4-inch diameter 304 stainless steel pipe butt welded together in accordance with usual practice in fabrication of boiling water reactor water lines. Thus, root insert fusion (308L alloy- Grinnel) as the first step was carried out with a gas (argon) tungsten arc and followed by the application of a second layer of 308L weld metal also by gas tungsten arc. Third and fourth layers of the same 308L stainless steel alloy were applied by the shielded metal arc weld (SMAW) process to complete the joint in the form illustrated in FIGS. 1 and 4. Then while the inside of the pipe joint was continuously cooled by a water spray at tap water temperature (about 60° F.), a backlay weld layer was applied to the pipe outer surface in the form of a ring about three inches wide and centered on the butt weld bead and one-quarter inch minimum total height. Again the SMAW process was used for this purpose and for depositing a second layer and a third layer of weld metal over the first backlay ring to provide the form of this invention shown in FIG. 7. The second and third layers were of the thickness of the first layer and the total thickness of the backlay weld was substantially uniform at about ¾-inch. The second and third layers of the backlay were, however, slightly shorter in the axial direction of the pipe, as also illustrated in FIG. 7.

The axial strain profile of the resulting pipe joint was found to be substantially that described by Curve L of FIG. 3.

EXAMPLE II

In an experiment like that of Example I except that the backlay weld was in the form of a number of separate axially extending ribs instead of the ring of Example I, the embodiment of this invention shown in FIG. 5 was fabricated. The ribs extended about 1½ inch on each side of the pipe weld and were spaced uniformly apart about two inches. Also, the second and third layers of each rib were shorter and narrower than the first or base layer which in each instance was about one inch in width over its full length, as illustrated.

The axial strain profile of the resulting pipe joint through the butt weld portion was found to be substantially that of the pipe joint of Example I.

What we claim as new and desire to secure by Letters Patent of the United States is:

1. The method of eliminating or substantially reducing the stress corrosion tendency in a weld constraint zone terminating within a primary weld heat affected zone of a butt welded austenitic steel pipe joint in a pipe in service in a nuclear reactor which comprises the step of applying to the outside of the pipe a secondary or overlay weld extending across the pipe joint and bridging on each side of the pipe joint beyond the axial extremities of the primary weld heat affected zone at the inner surface of the pipe.

2. The method of claim 1 in which the secondary weld is in the form of a ring extending around the circumference of the pipe and covering the primary weld and the adjacent annular surface portions of the pipe.

3. The method of claim 1 in which the secondary weld is in the form of a series of separate weld segments or ribs extending axially of the pipe and spaced apart radially around the circumference of the pipe.

4. The method of claim 2 in which the pipe is of 304 stainless steel and the primary and secondary welds are of 308L stainless steel.

5. The method of claim 1 in which the secondary weld is applied while water or other coolant is being flowed through pipe in contact with the primary weld heat affected zone portion of the pipe.

* * * * *